Oct. 30, 1951  H. NUSSHOLD  2,573,480
TOOLHOLDER
Filed April 8, 1948  2 SHEETS—SHEET 1
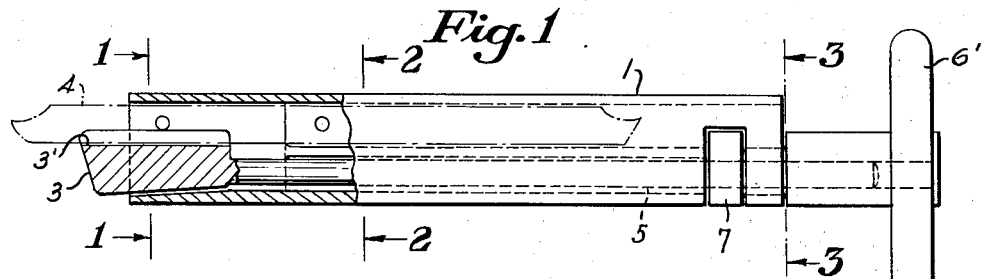
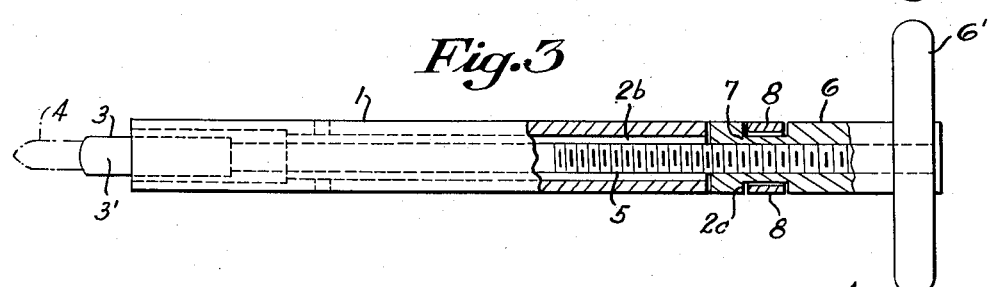
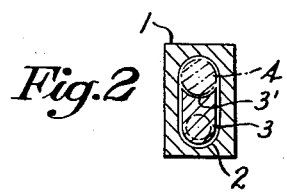
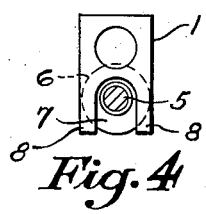
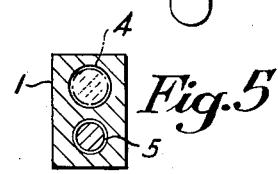
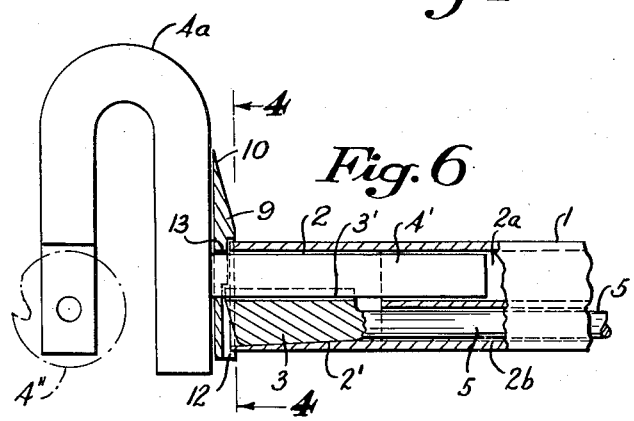
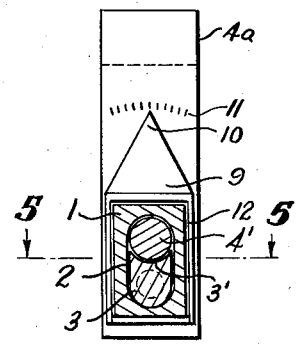
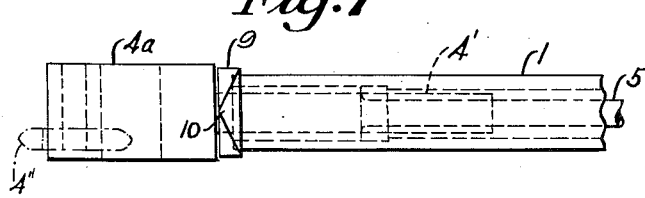
INVENTOR.
HUGO NUSSHOLD
BY
ATTORNEYS Oct. 30, 1951     H. NUSSHOLD     2,573,480
TOOLHOLDER Filed April 8, 1948     2 SHEETS—SHEET 2

INVENTOR.
HUGO NUSSHOLD
BY
ATTORNEYS

Patented Oct. 30, 1951

2,573,480

UNITED STATES PATENT OFFICE 2,573,480

TOOLHOLDER

Hugo Nusshold, Buenos Aires, Argentina

Application April 8, 1948, Serial No. 19,707
In Argentina April 8, 1947

5 Claims. (Cl. 29—96)

This invention relates to improvements in the holders for the tools of machine tools.

It is an object of the instant invention to provide a tool holder which will facilitate the work of the operator in removing and setting the tool.

A further object is to provide a tool holder suitable for the use of small tools.

Other objects of the instant invention will become apparent in the course of the following specification.

In the accomplishment of these objectives, the tool holder is made in four forms. In each form the holder is constituted of a rectangular bar having a mouth of elliptical cross section in one end, the surface in one end of the elliptical mouth being beveled and both ends communicating with aligned longitudinal openings extending to the opposite end. In the first form, an adjustable wedge having the same thickness at both ends is slidably inserted in the beveled end of the mouth while the exposed surface of the wedge has a longitudinal recess of semi-circular cross section for coacting with the tool. The wedge is adjustable in the mouth by a rod attached to the inner surface thereof and slidably inserted through the aligned longitudinal opening, the rod being moved longitudinally by a unit rotatably mounted on the rectangular member and in operable engagement with a threaded portion of the rod. The second form of the holder is like the first except that a pointer is mounted on the holder to indicate the degree of inclination of a U-shaped tool relative to the rectangular member. The third form of holder is also like the first except that a stationary wedge is used in conjunction with the adjustable wedge, the adjustable wedge having the longer end at the mouth entrance while the stationary wedge has the smaller end at the mouth entrance. The fourth form of holder is like the third except that the smaller end of the adjustable wedge is at the mouth entrance along with the larger end of the stationary wedge which reverses the direction of movement of the adjustable wedge when securing the tool.

The invention will appear more clearly when taken in connection with the accompanying drawings showing by way of example the preferred embodiments of the inventive idea.

In the drawings:

Figures 1, 2, 3, 4, 5, and 10 show the first embodiment of the tool holder constructed in accordance with the principles of this invention and in which:

Figure 1 is a side view of the tool holder in partial section with a tool inserted;

Figure 2 is a sectional view along 1—1 of Figure 1;

Figure 3 is a top view of the tool holder also in partial section and with the tool inserted;

Figure 4 is a sectional view along 3—3 of Figure 1;

Figure 5 is a sectional view along 2—2 of Figure 1; and

Figures 6, 7, 8, and 9 show the second embodiment of the tool holder and in which:

Figure 6 is a fragmentary side view of the tool holder equipped with an index to indicate the angle of twist of the tool;

Figure 7 is a top view of the tool holder shown in Figure 6;

Figure 8 is a sectional view along 4—4 of Figure 6; and

Figure 9:
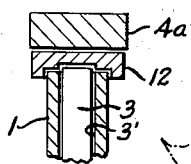

Figure 9 is a sectional view along 5—5 of Figure 8.

Figure 11:
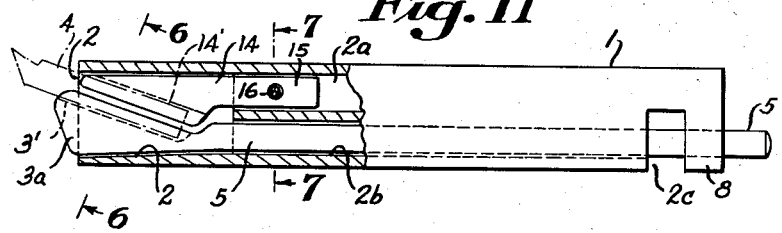
Figure 12:
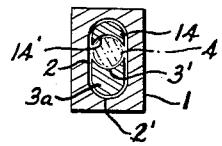
Figure 13:
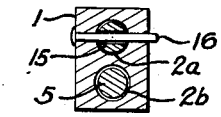

Figures 11, 12, and 13 show the third form of the improved tool holder and in which:

Figure 11 is a side view of the holder with a portion of the surface cut away to show the tool held in an angular position;

Figure 12 is a sectional view along 6—6 of Figure 11; and

Figure 13 is a sectional view along 7—7 of Figure 11.

Figure 15:
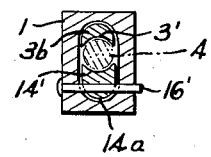
Figure 14:
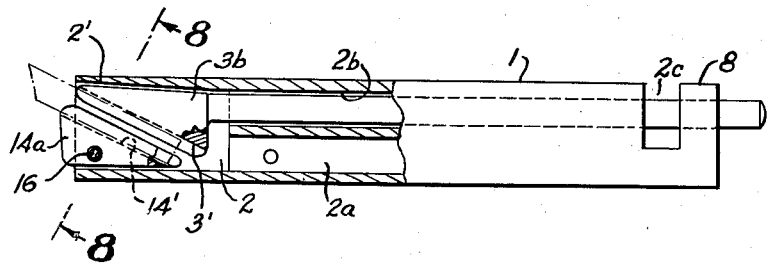

Figures 14 and 15 show the fourth form of the improved tool holder and in which:

Figure 14 is a side view of the holder with a portion of the surface cut away to show the tool held in a different angular position from that shown in the third form; and Figure 15 is a sectional view along 8—8 of Figure 14.

Referring now in greater detail to the first form of the improved tool holder shown in Figures 1, 2, 3, 4, 5, and 10 where like reference numerals indicate like parts, reference numeral 1 indicates the tool holder, and 4 the tool.

The tool holder 1, suitable for attachment to a machine tool (not shown), is a rectangular metallic member. In one end of the rectangular member is a mouth 2 of elliptical form as most clearly seen in Figure 2. The surface 2 of the mouth at one end is beveled or inclined and aligned with each end of the elliptical mouth at the back are two longitudinal openings 2a and 2b, both of which extend for the full length of the rectangular member.

Slidably disposed on the beveled surface 2' in the mouth 2 is an adjustable wedge 3, made with a longitudinal channel of semi-circular cross section 3' coacting with the tool 4. To the inner surface of the wedge 3 a rod 5 is attached for slidable insertion through the longitudinal opening 2b, the free end of the rod protruding beyond the end of the rectangular member. The surface of the rod 5 adjacent the protruding end is threaded for coaction with a nut 6 which is rotatably attached to a portion 8 of the rectangular member 1 and adjacent a notch 7. Keyed to the nut 6 is a wheel 6'.

Figure 10:
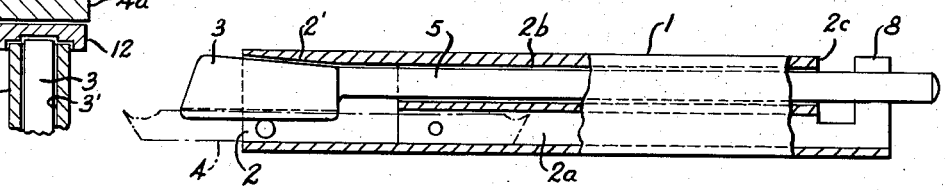
Figure 10 is similar to Figure 1 but with the tool in inverted position.

In operation, the tool is inserted through the mouth 2 and into the aligned longitudinal opening 2a to the approximate depth required by the work and the wedge 3 is moved into the mouth by rotating the wheel 6' in such a direction as to cause the rod 5 to move longitudinally in the direction of the wheel 6' pulling the wedge inwardly and by virtue of the inclined surface 2' forcing the tool 4 against the end of the mouth. It will be noted that the longitudinal center line of the tool 4 is parallel to the corresponding center line of the rectangular member. The only difference between the holder as illustrated in Figures 1 through 5 and in Figure 10 is that in the latter case the cutting edge of the tool is on the side of the wedge while in the former it is on the side opposite the wedge, the two positions depending upon the nature of the work and showing the versatility of the holder.

In the second form of the tool holder shown in Figures 6 through 9, the rectangular member 1 with the mouth 2, longitudinal openings 2a and 2b, beveled surface 2', and wedge 3 with longitudinal recess 3' actuated by the rod 5 is the same as the corresponding members of the previously described first form. However, in the rectangular member 1 of the second form, a tool 4a of U-shape having a shank 4' is inserted in the longitudinal opening 2a rather than the straight line tool of the first form.

With U-shaped tools it becomes necessary in some machine shop operations to incline the cutting element 4" to the work. Of course, this can be accomplished by twisting the shank 4' in the longitudinal opening 2a to give an angular set to the cutting element 4". However, to readily determine the degree of twist or inclination, a rectangular frame 12 of any suitable material is attached around the periphery of the mouth 2 and through which the wedge 3 and the shank 4' pass. At the top of the frame 12 is an integrally formed or otherwise attached triangular pointer 9 the apex 10 of which coacts with the scale indicia 11 inscribed in any known manner on the U-shaped tool 4a.

The operation with the holder of the second form is the same as that previously described for the first form. The mechanism for moving the rod 5 and the wedge 3 has not been shown or described since it is the same as in the first form of holder.

It will be noted that in the first and second forms of holder, the shanks of the tools are substantially horizontal but there are instances where it is desirable to incline the shank of a tool relative to the longitudinal center line of the holder.

The third form of holder, Figures 11, 12, and 13, show one construction for inclining the tool 4 in a holder 1, similar in all respects to the holder of the first form, except for the inclination of the surface of the adjustable wedge 3a and the inclusion of a coacting stationary wedge 14.

The adjustable wedge 3a (Fig. 11) has the high or thick portion at the front of the mouth 2 and thence inclines inwardly and downwardly. Of course, the longitudinal recess 3' of semi-circular cross section for seating the tool 4 is provided as well as the rod 5 and the actuating mechanism 6 and 6', shown in Figures 1 and 3 of the first form.

The stationary clamp 14 with the narrow or small end at the front of the mouth 2 and the elongation 15 in the longitudinal opening 2a is removably fastened in the mouth by the pin 16 through aligned openings in the sides of the rectangular member. The rims of the opposed faces of the stationary clamp 14 and adjustable clamp 3a are substantially parallel, the longitudinal recess 14' of the stationary wedge also of semi-circular cross section further coacting with the tool 4.

In operation, moving the adjustable clamp 3a inwardly by the lever mechanism of the already described first form will hold the tool 4 in the angular position shown in Figure 11. Of course, both the stationary wedge 14 and the adjustable wedge 3a are replaceable and exchangeable so that any reasonable inclination of the tool 4 relative to the holder 1 is possible.

In the fourth form of the improved tool holder shown in Figures 14 and 15, the rectangular member 1 is identical with that of the other embodiments but the adjustable and stationary clamps vary as shown in the following paragraph.

The adjustable wedge 3b differs from the corresponding member of the third form by having the inner end higher than the outer end while the stationary clamp 14a varies by having the outer end higher than the inner end, the stationary clamp being held in place by a pin 16 through aligned openings in the sides of the recess. As in the fourth form, the opposed surfaces of the wedges have longitudinal recesses of semi-circular cross section for gripping the tool and the rims of the opposed surfaces are in parallel planes.

The operation with the holder of the fourth form differs from that of the third in that the adjustable clamp 3b must be moved outward to grip the tool which is accomplished merely by reversing the direction of rotation of the wheel 6'.

What I claim is:

1. A holder for the tool of a machine tool, the holder comprising a rectangular member having an elliptical mouth in one end for the tool, the surface of the elliptical mouth at one end being beveled; the rectangular member further having two spaced longitudinal openings for the length thereof, the openings being aligned with the ends of the elliptical mouth, at least one wedge member for the mouth, the wedge member coacting with the beveled surface and having a longitudinal recess of semi-circular cross section for the length thereof, a rod disposed on the inner end of the wedge, the rod being slidably inserted through the aligned longitudinal opening and threaded adjacent the free end, and means between the threaded portion of the rod and the rectangular member varying the position of the wedge on the beveled surface of the mouth, the means comprising a nut rotatably disposed on the rectangular member in operable engagement with the threaded portion of the rod.

2. A holder for the tool of a machine tool according to claim 1 in which the center line of the semi-circular longitudinal recess of the wedge is parallel to the longitudinal center line of the rectangular member.

3. A holder for the tool of a machine tool according to claim 1 in which the rectangular member is characterized by having a frame disposed therearound adjacent the elliptical mouth, a triangular member disposed on the side of the frame opposite the beveled surface of the mouth, the apex of the triangular member being in the plane of the longitudinal center line of the rectangular member.

4. A holder for the tool of a machine tool, the holder comprising a rectangular member having an elliptical mouth in one end; the surface of one end of the mouth being beveled; the rectangular member further having two spaced longitudinal openings for the length thereof, the longitudinal openings being aligned with the ends of the elliptical mouth, an adjustable wedge member for the beveled surface of the mouth, the height of the outer end of the adjustable wedge member being greater than that of the inner end, a stationary wedge for the opposite end of the elliptical mouth, means removably securing the stationary wedge in the mouth, the height of the outer end of the stationary wedge being less than that of the inner end, the opposed surfaces of the adjustable and stationary wedges having formed therein longitudinal recesses of semi-circular cross section with the rims of the opposed surfaces parallel, and means varying the position of the adjustable wedge on the beveled surface.

5. A holder for the cylindrical tool of a machine tool according to claim 4 in which the adjustable wedge is characterized by having the inner end higher than the outer end and the stationary wedge by having the outer end higher than the inner end.

HUGO NUSSHOLD.

REFERENCES CITED

The following references are of record in the file of this patent:

UNITED STATES PATENTS

| Number | Name | Date |
| --- | --- | --- |
| 502,564 | Hunter | Aug. 1, 1893 |
| 1,300,042 | Swanson | Apr. 8, 1919 |
| 2,160,369 | Rikof | May 30, 1939 |
| 2,431,852 | Weld | Dec. 2, 1947 |